US006847411B2

(12) United States Patent
Pan et al.

(10) Patent No.: US 6,847,411 B2
(45) Date of Patent: Jan. 25, 2005

(54) MODULAR TELEVISION FOR PROVIDING A DISTINGUISHABLE SOUND ACCORDING TO A SELECTION OF A MODULE AND/OR A MODULE FUNCTION

(75) Inventors: Young-hwan Pan, Suwon (KR); Joon-hwan Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 524 days.

(21) Appl. No.: 10/033,894

(22) Filed: Jan. 3, 2002

(65) Prior Publication Data

US 2002/0118314 A1 Aug. 29, 2002

(30) Foreign Application Priority Data

Feb. 27, 2001 (KR) ........................................ 2001-10100

(51) Int. Cl.[7] ................................................ H04N 5/64
(52) U.S. Cl. .................... 348/839; 348/836; 348/552
(58) Field of Search ................................ 348/839, 739, 348/836, 383, 552; 381/322, 324, 71.2, 71.1, 71.7, 150, 337, 345; H04N 5/64

(56) References Cited

U.S. PATENT DOCUMENTS 6,144,362 A * 11/2000 Kawai ........................ 348/563
6,246,434 B1 * 6/2001 Takashima .................. 348/839
6,473,138 B1 * 10/2002 Fenner et al. ............... 348/839

* cited by examiner

*Primary Examiner*—Sherrie Hsia
(74) *Attorney, Agent, or Firm*—Sughrue Mion, PLLC

(57) ABSTRACT

A modular television for allowing a user to perceive an operation according to a selection of a module and/or a module function, is disclosed. The modular television includes a module rack having at least one module connection slot for mounting at least one module thereon, a main board for transmitting and receiving a multimedia signal to/from the module mounted in the module rack, mutually, and a distinguishable sound generator, when the module mounted on the module rack is selected, for providing a distinguishable acoustic signal corresponding the selection signal of the module.

9 Claims, 7 Drawing Sheets

- ACOUSTIC DATA STORING SECTION — 400, 420
- LUT — 440
- ACOUSTIC SIGNAL SELECTING SECTION — 460
- SWITCHING SECTION — 480

FIG.9

| MAIN MENU | A | B | C |
|---|---|---|---|
| FUNCTION 1 | D | E | F |
| FUNCTION 2 | G | H | I |
| ⋮ | ⋮ | ⋮ | ⋮ |

FIG.10

MODULAR TELEVISION FOR PROVIDING A DISTINGUISHABLE SOUND ACCORDING TO A SELECTION OF A MODULE AND/OR A MODULE FUNCTION

BACKGROUND OF THE INVENTION

1. Field of the Invention

The present invention relates to a modular television, and more particularly, to a modular television for allowing a user to perceive a selection of a module and/or a module function according to a selection signal. The present application is based on Korean Patent Application No. 2001-10100 filed on Feb. 27, 2001, which is incorporated herein by reference.

2. Description of the Related Art

The life span of a multimedia apparatus performing various multimedia functions is much shorter than that of a general television, which is generally about ten years. Accordingly, a digital television capable of performing a multimedia function is required to upgrade the function thereof whenever a multimedia apparatus of a new type appears. However, the general television has a shortcoming of a restricted level of upgrade. In order to overcome this shortcoming, the television has recently been developed to be capable of producing a digital image.

Due to the rapid development of digital image technology, domestic appliances are developed and commercialized into digital products in the market. That is, with digital ground wave broadcasting according to the standard of ATSC (Advanced Television Systems Committee), which started November 1998 in the U.S.A., appliance manufacturers commercialized a digital television picture receiver, a D-VHS, a DVD, and a digital camcorder, which record and reproduce digital broadcasting.

The appearance of the digital appliances showed the possibility that several domestic appliances could be incorporated into a single home network. A high-speed digital transfer system, i.e. the IEEE1394, is preferred for the interface technology between the appliances. The word "IEEE" is a shortened form of "Institute of Electrical and Electronics Engineers." The IEEE has been founded to promote the study of electric engineering and electronics, and is composed of scholars and engineers of the electrical and electronic field. The IEEE1394 was developed as the transfer technology between the digital apparatuses of Apple Computer Co., and refers to the interface technology capable of incorporating a communication apparatus, computer, and appliance into a single network, and transmitting and receiving the multimedia data at a high speed of 100 Mbps–1 Gbps One example of the digital apparatuses that make use of IEEE1394 is a modular television. The modular television is provided with a main board for connecting modules which perform multiple functions. The modules connected with the main board are capable of performing the newly developed multimedia functions. The main board functions to transmit and receive data between the modules and the digital television. Accordingly, even if there are multimedia functions that have not been developed for the first time, the digital television can easily perform the new multimedia functions through the modules mounted on the main board for performing the new multimedia functions.

Figure 1:
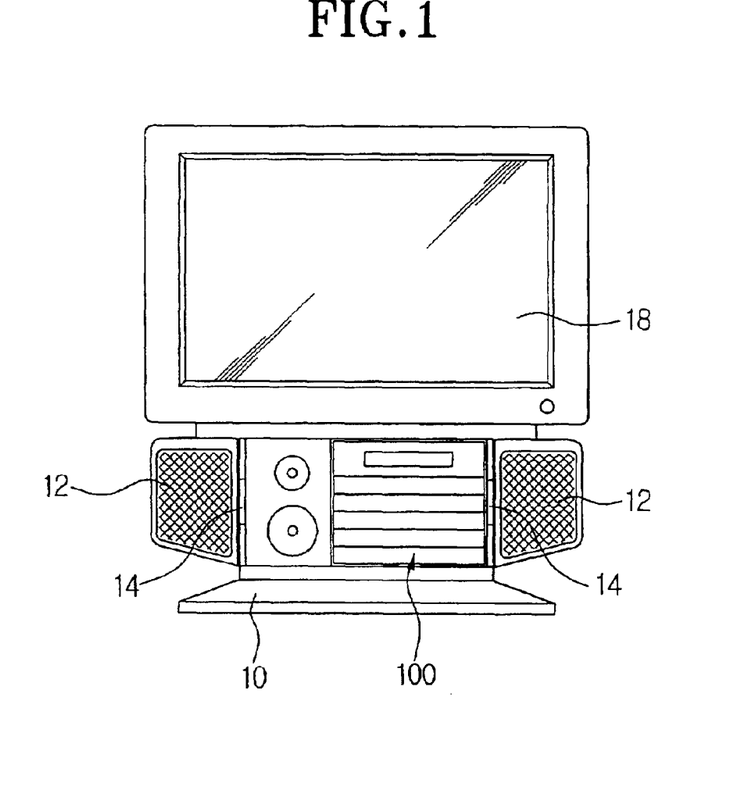
FIG. 1 shows a modular television of which a door is opened.

FIG. 1 shows the modular television of which a door is opened. The modular television is comprised of a module rack 100 disposed on a support 10, and a display 18 disposed on the top of the module rack 100. A door 14 is disposed at a front of the module rack 100 for opening or closing the module rack 100. Speakers 12 are disposed on both sides of the module rack 100.

A plurality of modules are mounted on the module rack 100. Here, the modules of multiple functions are selected as a user wishes, and the selected modules are mounted in the module rack 100.

Figure 2:
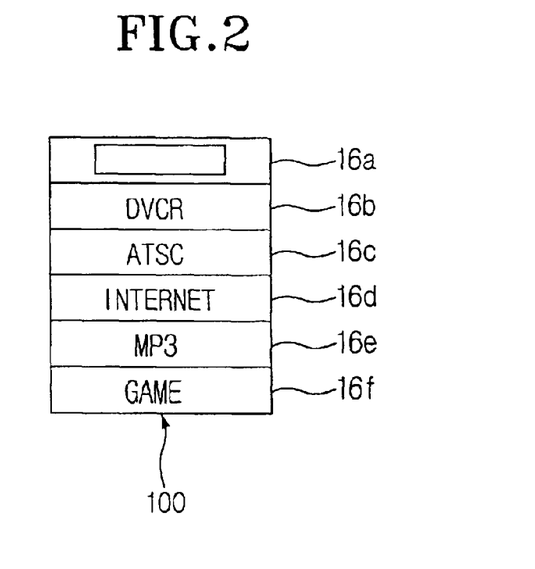
FIG. 2 shows an example of the module which is mounted in a module rack of FIG. 1.

FIG. 2 shows an example of the modules mounted on the module rack 100 of FIG. 1. Referring to FIG. 2, a digital videocassette recorder (DVCR) module 16b on the top performs a function of a digital videocassette recorder (DVCR). There is provided an insert port 16a on the DVCR module 16b for inserting the digital videocassette therethrough. An ATSC (Advanced TV System Committee) module 16c is disposed under the DVCR module 16b for allowing a user to watch a ground wave digital television broadcasting, and an internet module 16d is disposed under the ATSC module 16c for performing the multimedia communication and e-mail service through the Internet. An MP3 module 16e is disposed under the internet module 16d for performing a function of reproducing the high quality music, and a game module 16f is disposed under the MP3 module 16e for performing an on-line or off-line function. The module rack 100 for mounting the modules thereon is interfaced with the main board (not shown).

Figure 3:
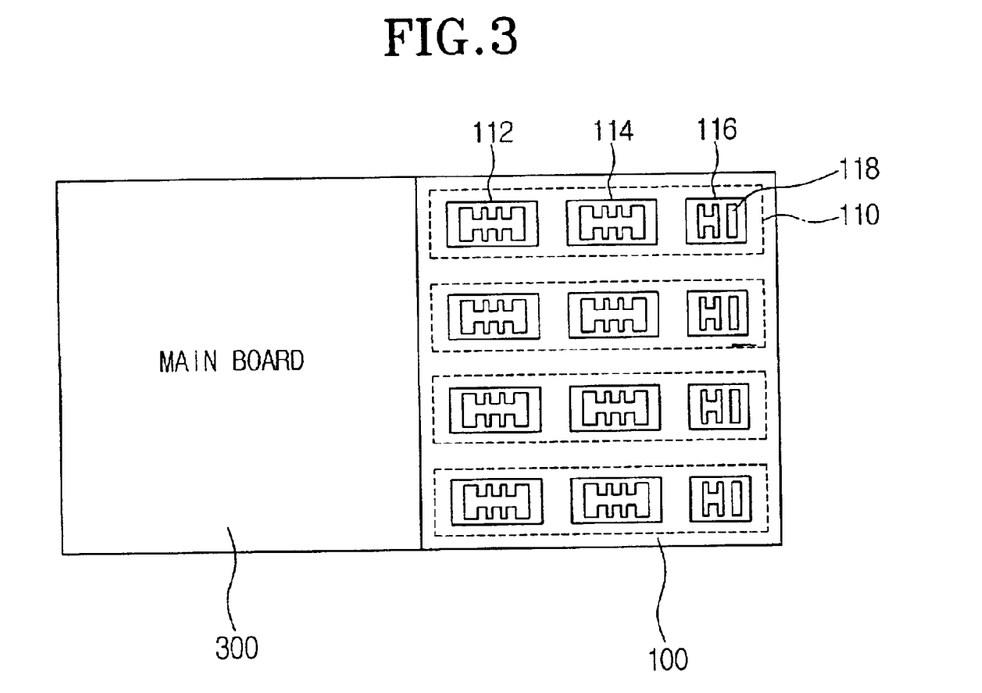
FIG. 3 shows a connecting structure of the module rack of FIGS. 1 and 2.
Figure 4:
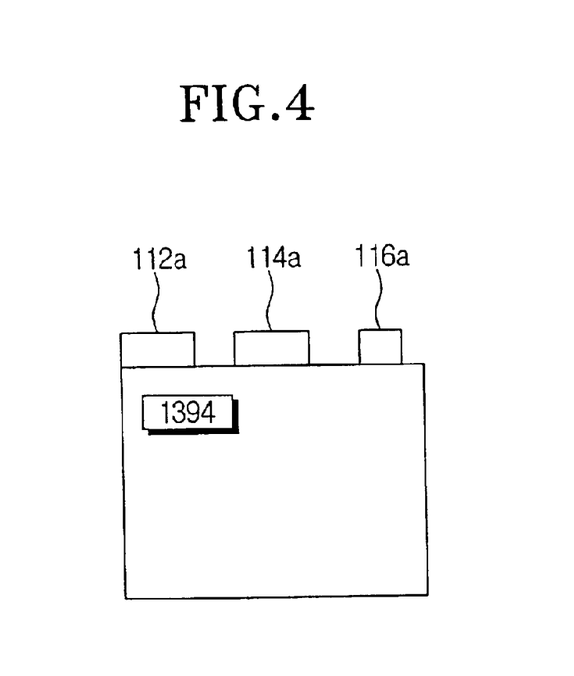
FIG. 4 shows a structure of the module in the module rack of FIGS. 1 and 2.

FIG. 3 shows a connection structure of the module rack 100 of FIGS. 1 and 2. FIG. 4 shows the structure of each module, which is mounted on the module rack 100 of FIGS. 1 and 2. The module rack 100 comprises module connection slots 110 for mounting the modules thereon, and the respective module connection slots 110 comprise two IEEE1394 slots 112 and 114 as an interface port, one power connector 116, and mounting-detecting means 118. The module rack 100 and the modules are mutually connected to each other according to a daisy chain method by using the two IEEE1394 slots 112 and 114. Referring to FIG. 4, each module comprises two IEEE1394 ports 112a and 114a, and one power connector 116a. The two IEEE1394 ports 112a and 114a and the power connector 116a are electrically interconnected with the two IEEE1394 slots 112 and 114 and the one power connector 116 of the module connection slots 110. When the modules are mounted, the mounting-detecting means 118 generates a mounting-detecting signal to notify the main board 300 and confirms the mounting of the modules. According to the modular television as constructed above, the digital television is capable of performing new functions of the modules by mounting the modules having new functions on the module rack 100, without requiring an extra upgrade of the digital television.

Figure 5:
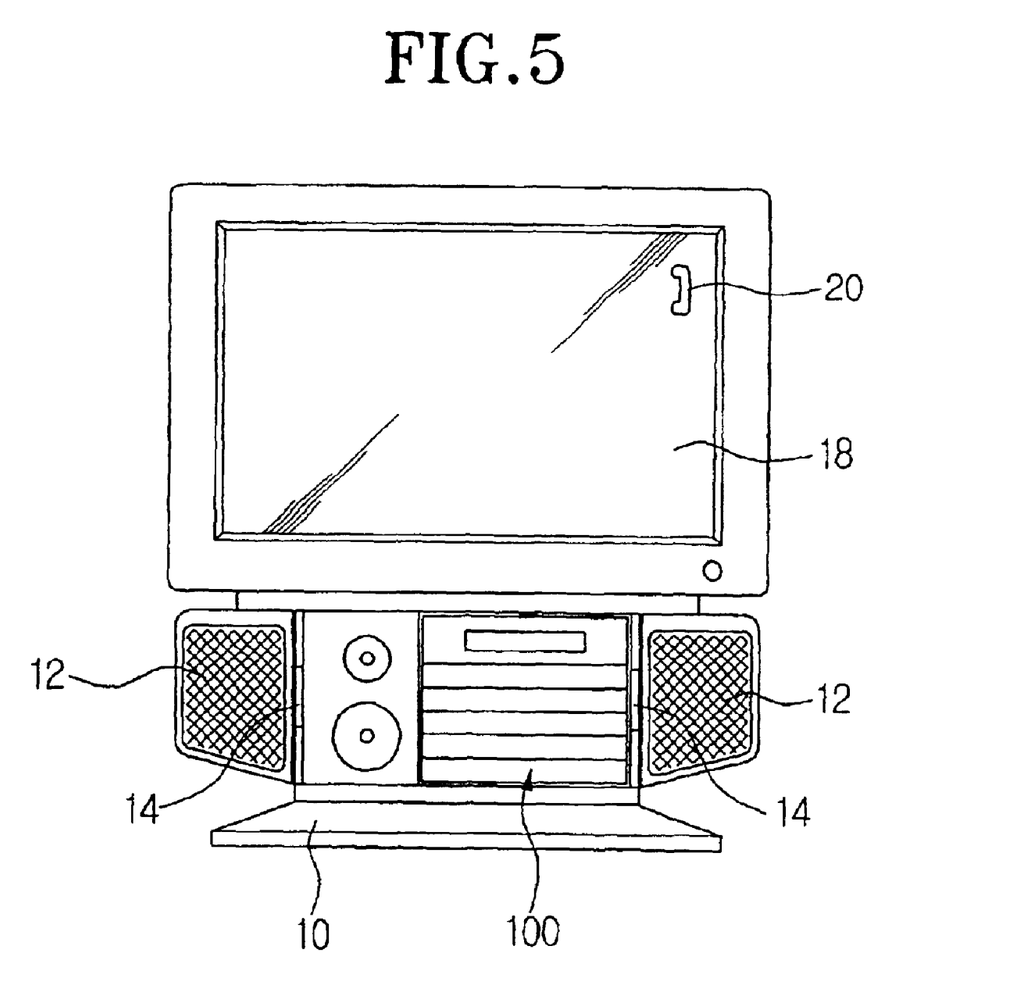
FIG. 5 shows an operation of the conventional modular television according to a selection of a module and/or a module function.

FIG. 5 shows an operation of the conventional modular television according to a selection of a module and/or a module function. The operations of the modules, which are selected by a user or operated by the corresponding signals, are displayed as images 20 on the display 18 so that the user can perceive the operations of the modules through the displayed images 20. Here, the images 20 of the operations of the modules correspond to the respective operations, such as play, pause, rewind, stop, and eject, with respect to a tape inserted thorough the insert port 16a at the DVRC module 16b.

However, when the user does not give specific visual attention to the display 18, but does something else like listening through the speakers 12, it is difficult for the user to perceive the operations of the modules corresponding to the images on the display 18. If the user waits for important mail or a telephone call, which is set to operate through the modules, since the user always has to give visual attention to the display 18 to perceive the operations of each module, the user usually feels tension and fatigue.

SUMMARY OF THE INVENTION

The present invention has been made to overcome the above-mentioned problems of the related art, and accordingly, it is an object of the present invention to provide a modular television for allowing a user to easily perceive an operation of the module according to a selection of a module mounted on the modular television and/or a module function without requiring the user to pay visual attention to a display.

To achieve the above object, a modular television, according to the present invention, includes a module rack comprising at least one module connection slot for mounting at least one module thereon, a main board for transmitting and receiving a multimedia signal to/from the module, mutually, according to a selection of the module, and a distinguishable sound generator, when the module mounted on the module rack is selected, for providing an acoustic signal corresponding the selected module.

The main board includes a selection signal inputting section for inputting a selection signal for the module or the detail function of the module, and inputting a control signal of the module corresponding to the input selection signal, and a controlling section for controlling an operation of the module according to the control signal and providing the distinguishable sound generator with operation information about the module.

If a detail function of the selected module is selected, the distinguishable sound generator provides a distinguishable acoustic signal corresponding to the selection signal. The distinguishable sound generator includes a distinguishable sound generating section mounted on the main board for generating a distinguishable acoustic signal corresponding to the operation information about the module, and a speaker for amplifying and outputting the acoustic signal generated from the distinguishable sound generating section.

Preferably, the speakers are provided in a number corresponding to the number of modules and/or the detail functions of the respective modules.

The distinguishable sound generating section includes a switching section for switching the acoustic signal output according to the selection of the module and/or the module function to the speaker, corresponding to the operation of the module.

BRIEF DESCRIPTION OF THE DRAWINGS

The object and characteristic of the present invention will be more apparent from the following detailed description of the preferred embodiments of the invention in conjunction with the accompanying drawings, in which.

DETAILED DESCRIPTION OF THE PREFERRED EMBODIMENT

Hereinafter, the present invention is described in greater detail with reference to the accompanied reference drawings, in which like reference symbols indicate the same or similar components.

Figure 6:
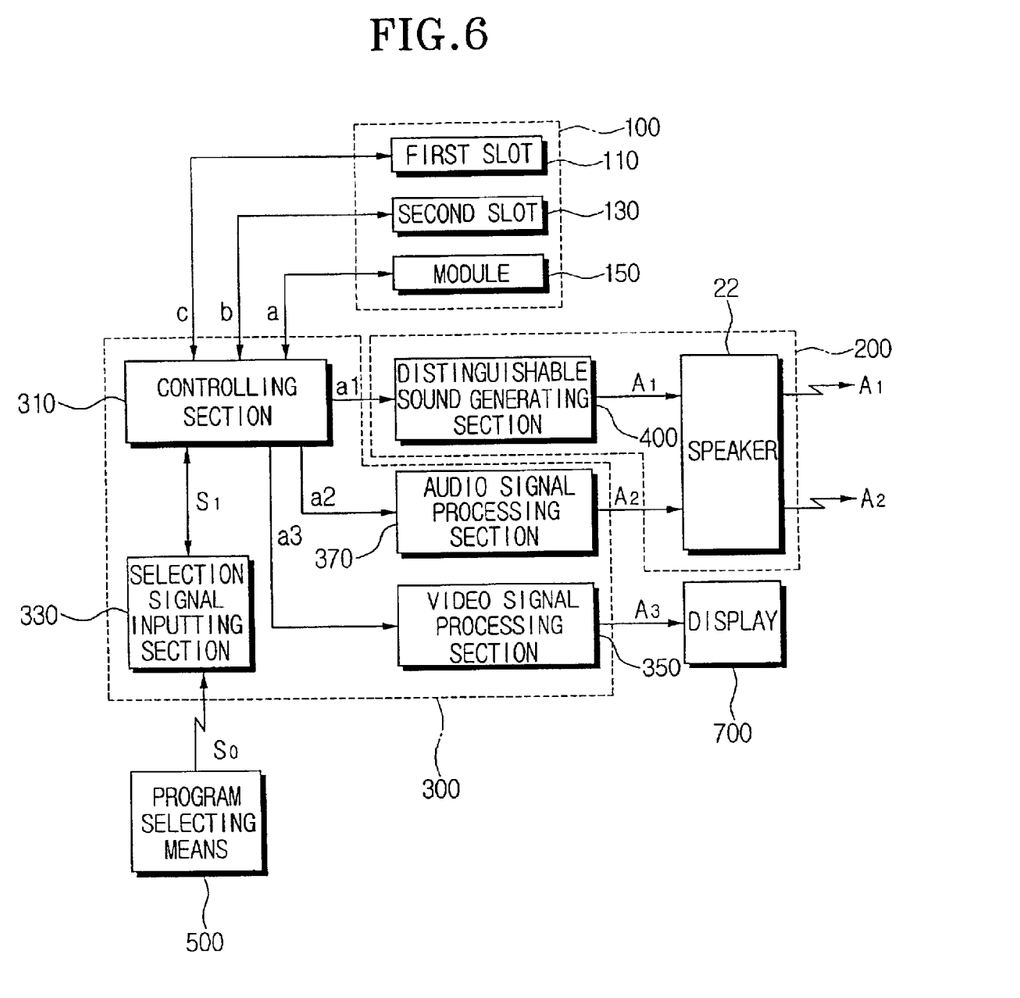
FIG. 6 is a block diagram showing a case in which a modular television does not have extra speakers for sound feedback in accordance with a first preferred embodiment of the present invention.

FIG. 6 is a block diagram showing a modular television for providing a distinguishable sound according to a selection of a module and/or a module function, in accordance with the first preferred embodiment of the present invention.

Referring to FIG. 6, the modular television includes a module rack 100 having a plurality of module connection slots for mounting more than one module, a main board 300 for transmitting and receiving an audio and/or a video signal to/from the module 150 mounted on the module rack 100, mutually, and a distinguishable sound generator 200 for outputting an acoustic signal corresponding to an input selection signal for the module 150 and/or a function of the module 150.

The module rack 100 has a first slot 110 and a second slot 130 as the module connection slots, and a third slot in which the module 150 is inserted. Preferably, the module rack 100 comprises as many module connection slots as the modules needed to upgrade the modular television, to realize a supplementary function to the basic functions. Each module connection slot mutually performs interfacing to transmit and receive data with respect to the main board 300. Signal (a), which interfaces between the module 150 and the main board 300, is identical to a selection signal input externally, or an operation signal such as the audio and/or the video signal operated according to a characteristic of the module 150.

The main board 300 comprises a selection signal inputting section 330 for inputting the operation signals for the module 150 mounted on each of the module connection slots, a controlling section 310 for controlling data flow between the module 150 and the main board 300, a video signal processing section 350 for processing and outputting one of the operation signals of the module 150 that is, for example, a graphic in the form of a video displayed on a display 700, and an audio signal processing section 370 for amplifying and outputting one of the operation signals of the module 150 that is, for example, a sound.

When a selection signal S0 for the module 150 or a detail function of the selected module 150 is input from program selecting means 500, the selection signal inputting section 330 outputs to the controlling section 310 a control signal $S_1$ for the module 150 corresponding to the input selection signal $S_0$. Here, the program selecting means 500 refers to a remote controller or a program selection button (not shown) attached to the modular television.

The controlling section 310 outputs to the corresponding module 150 the control signal $S_1$ input from the selection signal inputting section 330. The controlling section 310 also divides the operation signal a output from the module 150 into the audio signal a2 and the video signal a3, and then outputs the audio signal a2 to the audio signal processing section 370 and outputs the video signal a3 to the video signal processing section 350. At this time, when the operation signal a is input from the module 150, the controlling section 310 outputs the operation information a1 of the corresponding module 150 to the distinguishable sound generator 200 and the video signal processing section 350.

The video signal processing section 350 converts the video signal a3 input from the controlling section 310 to an image signal A3 and outputs the converted signal A3 to the display 700. The video signal processing section 350 processes the operation information a3 of the module input from the controlling section 310 into an image, and then outputs the image to the display 700. The audio signal processing section 370 converts, by low frequency amplification, the audio signal a2 input from the controlling section 310 to a low-frequency signal A2, and then outputs the low-frequency signal A2 to sound outputting means (not shown) for outputting the sound. According to the present invention, the low-frequency signal A2 is output to the distinguishable sound generator 200.

The distinguishable sound generator 200 includes a distinguishable sound generating section 400 for generating the distinguishable acoustic signal A1 through the operation information a1 of the module 150 inputted from the controlling section 310, and a speaker 22 for amplifying and outputting the distinguishable acoustic signal A1 generated from the distinguishable sound generating section 400. Preferably, the distinguishable sound generating section 400 is attached to the main board 300 for an easier manufacturing process. Meanwhile, the speaker 22 may amplify and output the acoustic signal A1 output from the distinguishable sound generating section 400 while amplifying and outputting the low-frequency signal A2 outputted from the audio signal processing section 370. The speaker 22 may also amplify and output the low-frequency signal A2 output from the audio signal processing section 370 and the acoustic signal A1 output from the distinguishable sound generating section 400, simultaneously. In such case, it is preferable that the acoustic signal A1 output from the distinguishable sound generating section 400 is designed based on the values obtained by experiments so as to generate a signal different from the low-frequency signal A2 output from the audio signal processing section 370 and within an audio frequency band.

Figure 7:
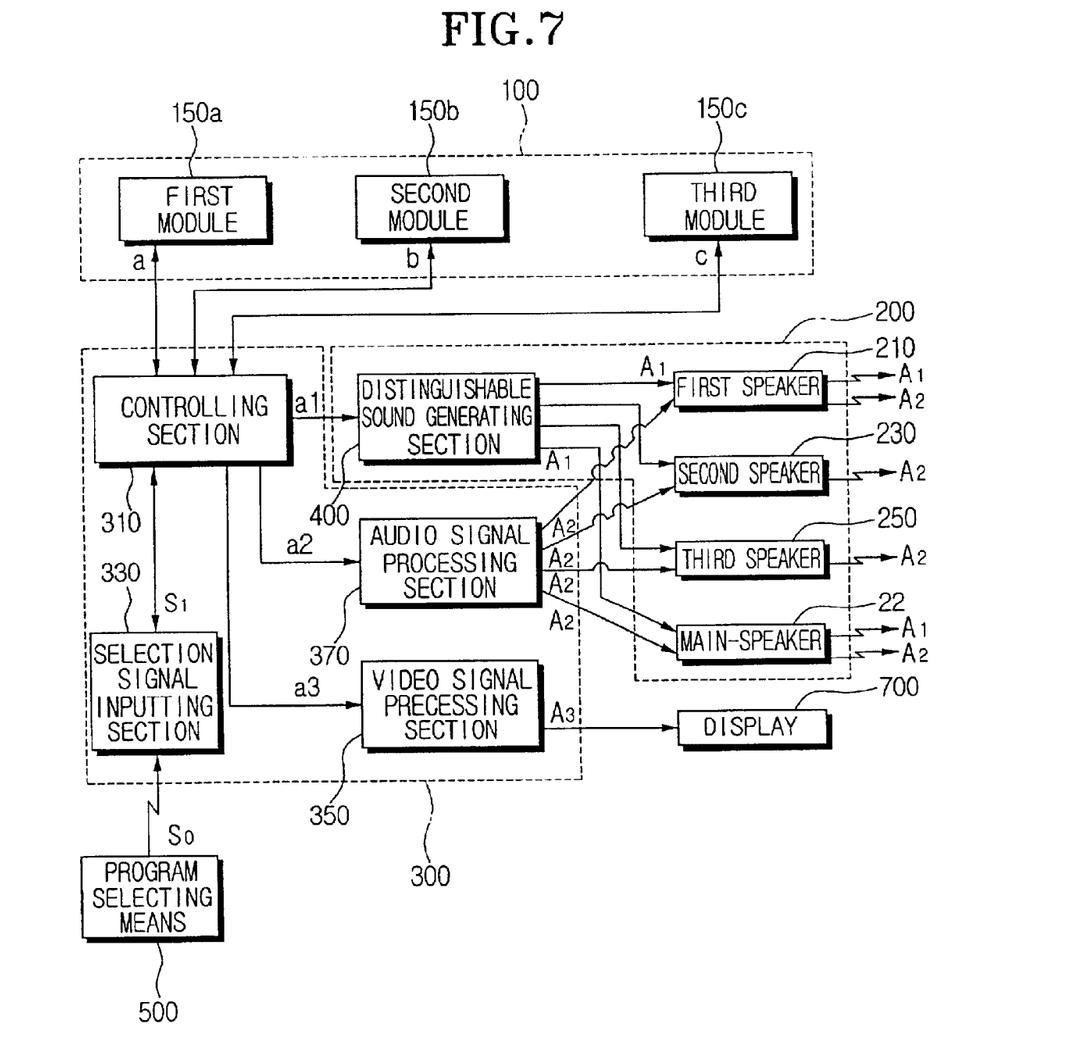
FIG. 7 is a block diagram showing a case in which a modular television has extra speakers for sound feedback in accordance with a second preferred embodiment of the present invention.

FIG. 7 is a block diagram showing a modular television for providing a distinguishable sound according to a selection of a module and/or a module function, in accordance with a second preferred embodiment of the present invention.

Throughout the description of the second preferred embodiment, the same reference symbols will be given to the blocks performing the functions identical to those performed in FIG. 6.

As shown in FIG. 7, the modular television includes a module rack 100 having a plurality of module connection slots for mounting a plurality of modules 150a, 150b, and 150c thereon, a main board 300 for transmitting and receiving audio signals and/or video signals to/from the modules 150a, 150b, and 150c, mutually, and a distinguishable sound generator 200, when a selection signal S0 for the modules 150a, 150b, and 150c and/or the functions of modules 150a, 150b, and 150c are input, for outputting an acoustic signal corresponding to the operation of one of the modules 150a, 150b, and 150c that is relevant to a selection signal $S_0$.

The modules 150a, 150b, and 150c are mounted on the module connection slots, respectively, and perform interfacing, i.e. transmitting and receiving data with respect to the main board 300, mutually. At this time, preferably, the module rack 100 has as many module connection slots as the modules needed to upgrade the modular television, so as to realize a supplementary function to the basic functions thereof. Signals a, b, and c interfacing between the modules 150a, 150b, and 150c and the main board 300 are identical to a selection signal input externally or operation signals such as audio signals and/or video signals operated according to the characteristic of the modules.

The main board 300 has a selection signal inputting section 330 for receiving a selection signal $S_0$ for the modules 150 mounted on the module connection slots and for outputting a control signal $S_1$ for the corresponding module, a controlling section 310 for controlling data flow between the modules 150a, 150b, and 150c and the main board 300, a video signal processing section 350 for processing and outputting signals of the operation signals of the modules 150a, 150b, and 150c that are related to a graphic in the form of a video displayed on a display 700, and an audio signal processing section 370 for amplifying and outputting operation signals of the modules 150a, 150b, and 150c that are related to sound. Here, the controlling section 310 outputs the control signal $S_1$ to the corresponding module 150a, 150b, or 150c input from the selection signal inputting section 330. The controlling section 310 also divides the operation signals a, b, and c corresponding to the modules 150a, 150b, and 150c, output from the modules 150a, 150b, and 150c, into the audio signals and the video signals, and then outputs the audio signals to the audio signal processing section 370, and outputs the video signals to the video signal processing section 350. At this time, when the operation signals a, b, and c are input from the modules 150a, 150b, and 150c, the controlling section 310 outputs the respective operation information about the modules 150a, 150b, and 150c to the distinguishable sound generator 200.

The distinguishable sound generator 200 includes a distinguishable sound generating section 400 for generating distinguishable acoustic signals through the respective operation information of the modules 150a, 150b, and 150c input from the controlling section 310, and speakers 22, 210, 230, and 250 for amplifying and outputting the distinguishable acoustic signals generated from the distinguishable sound generating section 400. Here, preferably, the distinguishable sound generating section 400 is attached to the main board 300 for easier manufacturing and delivery. Also, the speakers 22, 210, 230, and 250 include a main-speaker 22 and sub-speakers 210, 230, and 250. The main-speaker 22 amplifies and outputs the audio signal corresponding to the operation signals of the modules 150a, 150b, and 150c and the acoustic signal output from the distinguishable sound generating section 400 according to the operation information. The sub-speakers 210, 230, and 250 are provided in a number corresponding to the number of the modules 150a, 150b, and 150c, and are set to correspond to the respective modules 150a, 150b, and 150c on a one-to-one basis. The sub-speakers 210, 230, and 250 amplify and output sub-acoustic signals such as a surround sound signal among the audio signals corresponding to the modules in operation, and the sub-speakers 210, 230, and 250 are connected to the modules 150a, 150b, and 150c on a one-to-one basis, so as to amplify and output the acoustic signals output from the distinguishable sound generating section 400 according to the operation information corresponding to the modules in operation.

While the sub-speakers 210, 230, and 250 amplify and output low-frequency signals output from the audio signal processing section 370, the sub-speakers 210, 230, and 250 may also amplify and output the acoustic signals output from the distinguishable sound generating section 400. In this case, since the sub-speakers 210, 230, and 250 are connected to the modules corresponding to the operation information thereof on a one-to-one basis, the corresponding speaker itself amplifies and outputs the acoustic signal. As shown in FIG. 7, the acoustic signal according to the operation of the first module 150a is output through the first speaker 210. The acoustic signal, according to the operation of the second module 150b, is output through the second speaker 230. The acoustic signal, according to the operation of the third module 150c, is output through the third speaker 250.

If the first module 150a is selected to operate, the controlling section 310 outputs the operation information a1 of the first module 150a into the distinguishable sound generating section 400. Then, the distinguishable sound generating section 400 outputs the acoustic signals A1 corresponding to the input operation information a1 of the first module 150a to both the first speaker 210 connected to the first module 150a and the main speaker 22. If the second module 150b is selected, the distinguishable sound generating section 400 outputs the acoustic signals A2 corresponding to the operation information a2 of the second module 150b to both the second speaker 230 and the main speaker 22.

Here, the sub-speaker may be provided in a number corresponding to the number of the respective module functions.

The video signal processing section 350 converts the video signal a3 input from the controlling section 310 to image signals A3, and then displays the image signals A3 on the display 700. The audio signal processing section 370 converts the audio signals a2 input from the controlling section 310 to the low-frequency signals A2 through low-frequency amplification, and then outputs the low-frequency signals A2 into the distinguishable sound generating section 200. At this time, while the main signals among the output signals are output through the main speaker 22, the sub signals are output through the corresponding speakers 210, 230, and 250, respectively.

Figure 8:
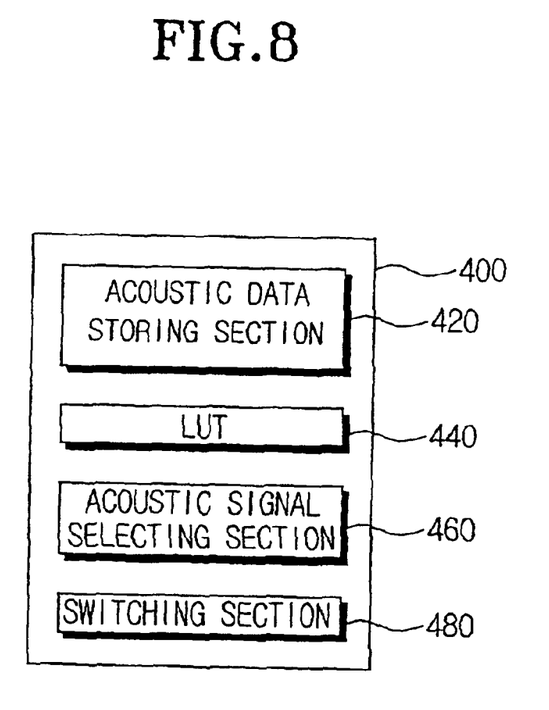
FIG. 8 is a block diagram showing the distinguishable sound generating section of FIG. 7 in detail.

FIG. 8 is a block diagram showing the distinguishable sound generating section 400 of FIG. 7 in detail. Referring to FIG. 8, the distinguishable sound generating section 400 includes an acoustic data storing section 420, a lookup table 440, an acoustic signal selecting section 460, and a switching section 480.

The acoustic data storing section 420 stores the different acoustic signal datum according to the modules and/or the functions of each module. The lookup table (LUT) 440 stores a plurality of the acoustic signal datum to select and set the acoustic signals corresponding to the operations of the modules. The acoustic signal selecting section 460 selects the acoustic signals corresponding to the modules and/or functions of each module according to the selection signal through the acoustic signal datum of the lookup table 440, and stores the acoustic signal datum corresponding to the operation of the selected module in the acoustic data storing section 420. The switching section 480 switches the acoustic signals selected from the acoustic signal selecting section 460 to the sub-speakers 210, 230, and 250, which are connected to correspond to the operation of the modules 150a, 150b, and 150c, and outputs the selected signal through the sub-speakers.

Figure 9:
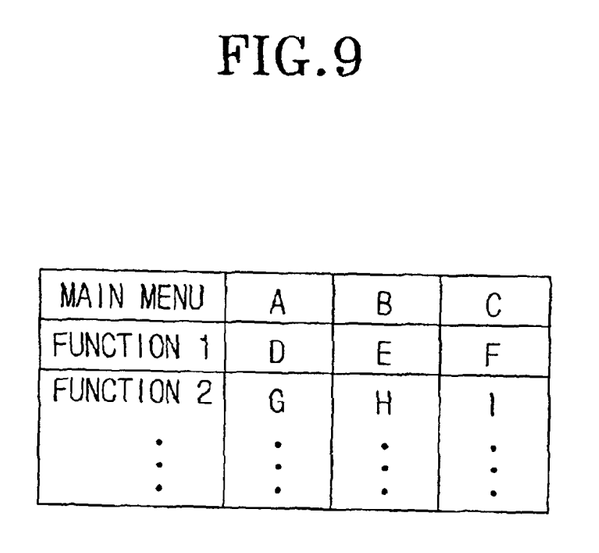
FIG. 9 is a table showing an example of a look up table of FIG. 8.

FIG. 9 is a table showing an example of the lookup table of FIG. 8. Referring to FIG. 9, selectable acoustic signal datum for selection of the modules 150a, 150b, and 150c is stored in the directory of a main menu. The acoustic signal datum for a selection of the acoustic signals, according to detailed functions of selected modules, is stored in the directory according to each function.

Figure 10:
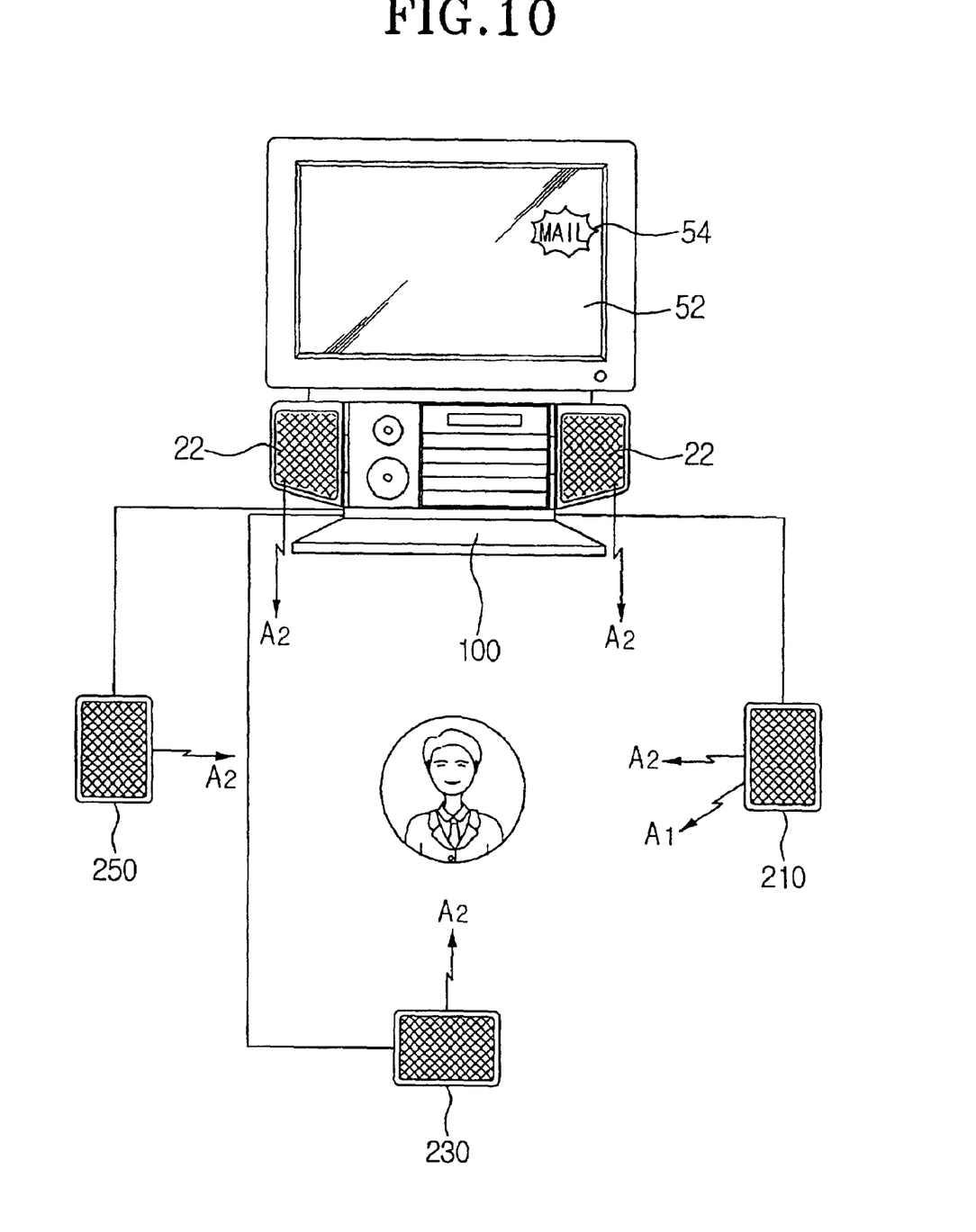
FIG. 10 shows an example the modular television of FIG. 7 expressed in space.

FIG. 10 shows an example of the modular television of FIG. 7 realized in space. Referring to FIG. 10, when mail is delivered by the operation of the module related to the Internet while a user watches a program of the television, the mail delivery information is displayed on a display 52 in the form of an image 54. While the respective speakers 22, 210, 230, and 250 output sounds A2 related to the program the user is watching and listening to, the speaker 210, which is connected to the module related to the Internet, outputs the acoustic signals A1 set with respect to the mail delivery. At this time, the acoustic signals A1 may use a voice sound such as "You've got mail" or "Mail", or may use melody sound of an onomatopoeic word.

Accordingly, since the user perceives the operations of the modules 150a, 150b, and 150c through the auditory sense, the user does not have to carefully pay unnecessary visual attention to the display 52. Also, if the sub-speakers 210, 230, and 250, which correspond to the operations of the modules 150a, 150b, and 150c, are disposed at the different positions, respectively, it is easy for the user to perceive the operations with respect to the modules 150a, 150b, and 150c through the auditory sense.

Although the different acoustic signal output corresponding to the operation of the module, which is mounted on the modular television according to the present invention, has been described above, the present invention may be adopted to an image display apparatus, including a general television and appliances on which a speaker is mounted to output a sound corresponding to the respective operations.

Although the preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A modular television comprising:
    a module rack comprising at least one module connection slot for mounting at least one module thereon;
    a distinguishable sound generator, when one of said at least one module mounted on the module rack is selected, for providing an acoustic signal corresponding to the selected module; and
    a main board for transmitting and receiving a multimedia signal to/from the module, according to a selection signal of the selected module.

2. The modular television of claim 1, wherein, when a detail function of the selected module is selected, the distinguishable sound generator provides a distinguishable acoustic signal corresponding to the selection signal.

3. The modular television of claim 2, wherein the main board includes:
    a selection signal inputting section for inputting the selection signal for the selected module or the detail function of the selected module and outputting a control signal of the selected module corresponding to the input selection signal; and a controlling section for controlling an operation of the selected module according to the control signal, and providing the distinguishable sound generator with operation information about the selected module.

4. The modular television of claim 3, wherein the distinguishable sound generator includes:

a distinguishable sound generating section mounted on the main board for generating a distinguishable acoustic signal corresponding to the operation information about the selected module.

5. The modular television of claim 4, wherein the distinguishable sound generating section includes a switching section for switching the acoustic signal output according to at least one of the selection of the selected module and a function of the selected module, to speakers, corresponding to an operation of the selected module.

6. A modular television comprising:

a module rack comprising at least one module connection slot for mounting at least one module thereon;

a distinguishable sound generator, when one of said at least one module mounted on the module rack is selected, provides an acoustic signal corresponding to the selected module, and when a detail function of the selected module mounted on the module rack is selected, provides an acoustic signal corresponding to the selected detail function; and a main board for transmitting and receiving a multimedia signal to/from the selected module, according to a selection signal of the selected module.

7. The modular television of claim 6, wherein the main board includes:

a selection signal inputting section for inputting the selection signal for the selected module or the detail function of the selected module and outputting a control signal of the selected module corresponding to an input selection signal; and a controlling section for controlling an operation of the selected module according to the control signal and providing the distinguishable sound generator with operation information about the selected module.

8. The modular television of claim 7, wherein the distinguishable sound generator includes:

a distinguishable sound generating section mounted on the main board for generating a distinguishable acoustic signal corresponding to the operation information of the selected module.

9. The modular television of claim 8, wherein the distinguishable sound generating section includes a switching section for switching the distinguishable acoustic signal output according to at least one of the selection of the selected module and a function of the selected module, to speakers, corresponding to the operation of the selected module.

* * * * *